US006826523B1

United States Patent
Guy et al.

(10) Patent No.: US 6,826,523 B1
(45) Date of Patent: Nov. 30, 2004

(54) APPLICATION DEVELOPMENT INTERFACE FOR MULTI-USER APPLICATIONS EXECUTABLE OVER COMMUNICATION NETWORKS

(75) Inventors: Charles H. Guy, San Diego, CA (US); Glen A. Van Datta, San Diego, CA (US); João A. Fernandes, Seattle, WA (US)

(73) Assignee: Sony Computer Entertainment America Inc., Foster City, CA (US)

(*) Notice: Subject to any disclaimer, the term of this patent is extended or adjusted under 35 U.S.C. 154(b) by 727 days.

(21) Appl. No.: 09/704,514

(22) Filed: Nov. 1, 2000

(51) Int. Cl.[7] .............................................. G06F 9/45
(52) U.S. Cl. ..................... 703/22; 709/227; 370/260
(58) Field of Search ....................... 703/22; 707/102; 709/207, 220, 227, 204, 246; 370/260

(56) References Cited

U.S. PATENT DOCUMENTS

| 4,572,509 A | 2/1986 | Sitrick ........................ 273/85 G |
|---|---|---|
| 5,313,631 A | 5/1994 | Kao ............................ 395/600 |
| 5,317,568 A | 5/1994 | Bixby et al. ................ 370/85.6 |
| 5,442,771 A | 8/1995 | Filepp et al. ................ 395/650 |
| 5,633,872 A | 5/1997 | Dinkins ....................... 370/312 |
| 5,835,911 A | 11/1998 | Nakagawa et al. .......... 707/203 |
| 5,841,980 A | 11/1998 | Waters et al. ........... 395/200.34 |
| 6,073,161 A | 6/2000 | DeBoskey et al. ........... 709/200 |
| 6,112,024 A | 8/2000 | Almond et al. .............. 395/703 |
| 6,247,017 B1 * | 6/2001 | Martin ........................ 707/102 |
| 6,549,946 B1 * | 4/2003 | Fisher et al. ................ 709/227 |
| 6,587,874 B1 * | 7/2003 | Golla et al. ................. 709/220 |
| 6,636,889 B1 * | 10/2003 | Estrada et al. .............. 709/203 |

* cited by examiner

Primary Examiner—Albert W. Paladini
(74) Attorney, Agent, or Firm—Martine & Penilla, LLP

(57) ABSTRACT

An application interface and method for developing multi-user applications executable over a distributed network is described. An object definition structure is provided for client-based definition of objects utilized by a multi-user application. The object definition includes a plurality of characteristics associated with the object and utilized by the application to effect interaction with other clients over the distributed network. A broadcast schedule is associated with one or more of the plurality of characteristics and controls the transmission of object data from the creating client to other clients in the distributed network. During execution of the multi-user application, characteristics of the object are automatically updated periodically or upon the change of a characteristic relative to a preset threshold value, in accordance with values provided in the broadcast schedule. The object definition created by the client is used by all functions and processes within the multi-user application that utilize the object.

18 Claims, 6 Drawing Sheets

APPLICATION DEVELOPMENT INTERFACE FOR MULTI-USER APPLICATIONS EXECUTABLE OVER COMMUNICATION NETWORKS

FIELD OF THE INVENTION

The invention relates generally to multi-user applications executed over communication networks, and more specifically to an application interface for developing multi-user applications for distributed networks.

BACKGROUND OF THE INVENTION

With the advent of wide area computer networks (WANs) and the Internet, various distributed client server computing models have been developed to facilitate the transmission of data among network nodes. The structure of the links among computers and sub-networks within a network is referred to as the infrastructure of the particular network or Internet. Each network has one or more principal links that connects primary nodes of the particular network by means of network "backbones." Network backbones are designed to carry a high volume of traffic between primary network nodes. Backbones are often defined in relation to the type of communications link used to transmit data along the backbone between nodes. Popular national network backbone link types include newer multicast protocols such as the Asynchronous Transfer Mode (ATM) and more conventional point-to-point links. The type of protocol or link used helps define the manner in which data is transmitted along the particular backbone. When data transmission occurs along a network backbone using a multicast protocol, information is sent directly after a brief setup time between sender and receiver. The data is therefore transferred along the most expeditious route across the network infrastructure to its destination. Data transmission occurring along a network backbone using a conventional point-to-point link, in contrast, requires routing over multiple point-to-point links between source and destination.

The volume of data transmitted across a network backbone is dependent on the bandwidth of the particular backbone. In computer networks, greater bandwidth indicates faster data transfer capability. Multiple data transmissions are sent along a network backbone using multiplexing techniques, whereby the volume of data transmission along the backbone is determined by the bandwidth of the particular link. Although a factor in all network communications, bandwidth limitations create particular problems in transmissions across national network backbones, regardless of the protocol or link used.

Because of the relative speed with which data is transmitted over network backbones and the relatively small amount of data transmitted in each data packet, latencies caused by network bandwidth limitations have not traditionally been a significant drawback in network operations. The advent of multi-user interactive applications, however, has made this a pressing issue.

A multi-user application is a computer program run on a computer system that allows multiple participants that are geographically dispersed to interact with the computer program and other users in an application environment, typically via communication links. For example, a multi-user application may be a video game that allows different, geographically dispersed participants to participate in the same game and compete against one another virtually in real time. Another example is a multi-user flight simulator or aircraft combat simulation that allows participants to pilot an aircraft within an airspace and to engage in combat with other participants in the same airspace. The frequency and extent to which users in a multi-user application interact with the computer program and other users is dependent on a variety of considerations. The considerations include the data transmission capacity of the relevant communication links between each user and the computer system, the nature of the application (whether it implicates data-intensive operations involving graphics or multimedia), and, to a lesser extent, the geographical proximity of each user to the computer system. If real-time interaction is required among users within the application environment, implicating data-intensive operations, the data transmission capacity of the communication links becomes especially critical.

Each application environment defines specific boundaries in which one or more participants may operate. In the above aircraft combat simulation example, the airspace in which the aircraft is piloted may be analogized to the application environment. Heretofore, to facilitate true interaction among participants within an application environment, complete information on every participant within a given environment needed to be transmitted to every other participant in that environment. When such complete information or data was sent via data packets over the network backbone, the bandwidth limitations discussed above either limited the number of participants or prohibited complex applications requiring real-time interaction among participants. The more complex the application, the greater the need for complete information about each participant. More information, in turn, results in larger data packets, which increases the burden on the network backbone. For these reasons, existing multi-user applications have been unable to achieve national interactivity among participants.

The backbone loading problems present a send/receive imbalance in any type of centrally administered multi-user application. In order for remote participants to remain aware of other participants, a central server will always be sending out a greater number of data packets than it receives. Existing multi-user applications have been generally unable to overcome bandwidth limitations throughout the network to provide for real-time, data intensive, interactive participation. The tradeoffs between the amount of data needed in each data packet and the number of participants across a particular network backbone have limited the ability of multi-user applications to achieve national participation where all participants are aware of all other relevant participants within their particular application environment. The greater the amount of data transmitted about each participant in a particular application environment, the fewer the number of participants able to participate. While sacrificing data to enable a greater number of participants has been used in existing systems, such solution is unworkable when seeking real-time interaction because limiting data either restricts participation to limited areas or prevents seamless participation within a given application environment. If inadequate or insufficient data is communicated to relevant participants in a multi-user application, participants will be unable to satisfactorily participate. The tradeoffs in data transfer and number of participants have limited the development of truly national-scale multi-user applications.

One solution to the problem of reducing bandwidth loading for multi-user applications operating over a communication network is described in U.S. Pat. No. 5,841,980, entitled "Distributed System for Communication Networks in Multi-User Applications", assigned to the assignee of the present application and which is hereby incorporated by reference. This system divides the application environment of a multi-user application into different regions, and defines multiple zones of interest relative to an application environment and participants based on object type, position relative to the participant or pre-determined location, and priority. Only relevant data applicable to each participant within the given application environment is transmitted along the network backbone.

Application programming interfaces and application programs that utilize typical multi-user network systems typically require a significant amount of work to define nodes and other entities that use the network system. In such cases, there are often many unknowns related to the development of programs or applications that make use of the network architecture. Typically objects utilized by the multi-user applications are defined by a server and propagated to the clients. The object definitions must be recreated for each function or process within the client side applications that utilize the object. Moreover propagation of object updates is typically performed for all of the characteristics of the objects. Thus creation of objects for multi-user applications and the transmission of updated object data is relatively inefficient in present multi-user application development systems. What is needed, therefore, is a simplified development model for the development of interactive programs, games, and applications that utilize multi-user network engines.

SUMMARY OF THE INVENTION

An application interface and method for developing multi-user applications executable over a distributed network is described. An object definition structure is provided for client-based definition of objects utilized by a multi-user application. The object definition includes a plurality of characteristics associated with the object and utilized by the application to effect interaction with other clients over the distributed network. A broadcast schedule is associated with one or more of the plurality of characteristics and controls the transmission of object data from the creating client to other clients in the distributed network. During execution of the multi-user application, characteristics of the object are automatically updated periodically or upon the change of a characteristic relative to a preset threshold value, in accordance with values provided in the broadcast schedule. The object definition created by the client is used by all functions and processes within the multi-user application that utilize the object. One or more filter functions can be specified for limiting the propagation of the updated functional characteristics of the object to one or more of the other clients in the network.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

The present invention is directed to providing a simplified interface for the development of applications used in network engines that reduce bandwidth limitations in multi-user interactive applications over a large-scale network.

Distributed Network for Multi-User Applications

Figure 1:
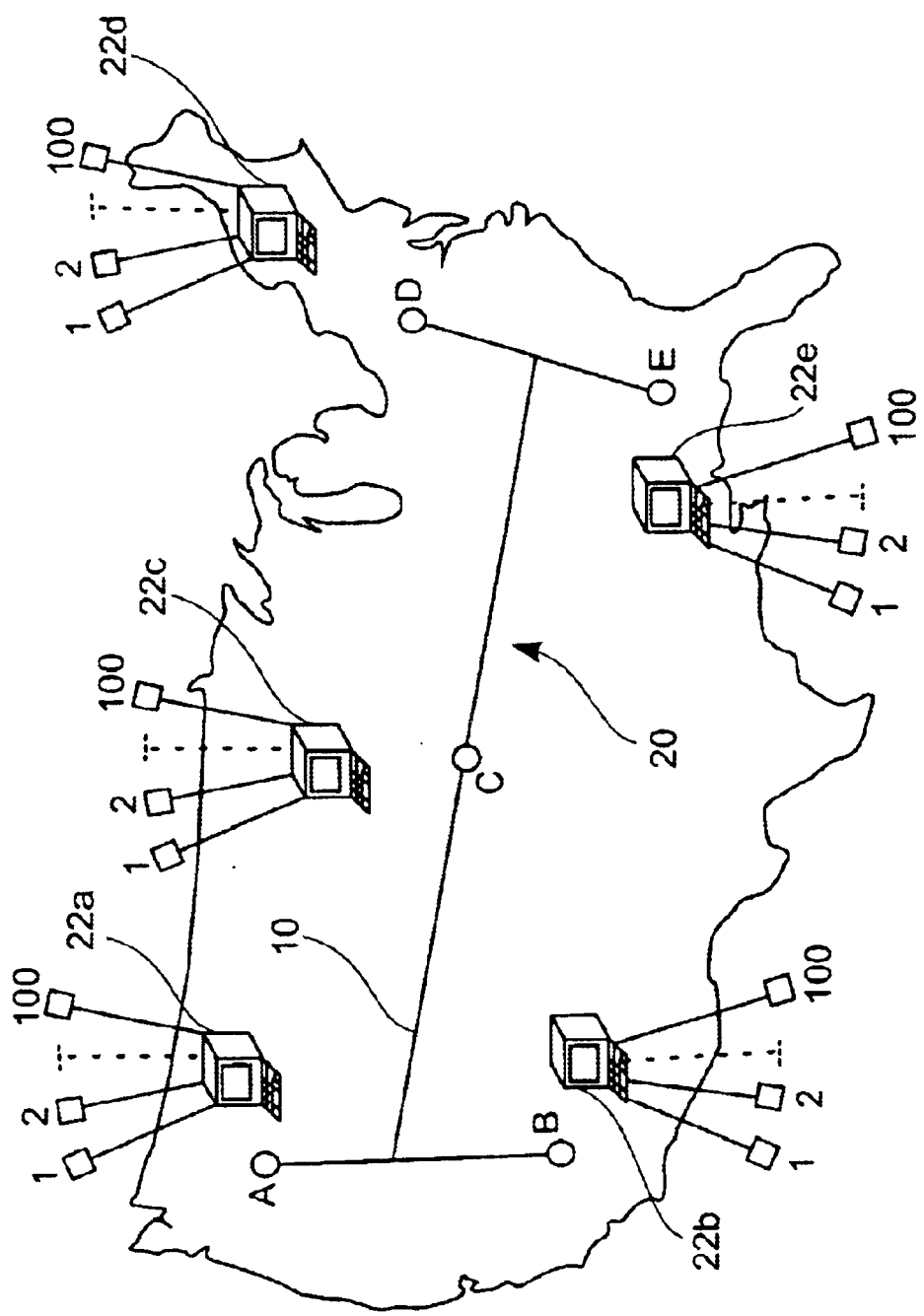
FIG. 1 illustrates a distributed computer network system that allows participants to execute multi-user interactive applications, and that implements embodiments of the present invention.

FIG. 1 illustrates a distributed computer network system that allows participants to execute multi-user interactive applications, and that implements embodiments of the present invention. Five discrete areas labeled A through E are defined in the system. Each area A through E represents a single server 22a through 22e, respectively, that are connected to each other by a network backbone 10. For purposes of illustration, each server 22 serves an equal number of client computers (participants) in each region, e.g., 100 participants, illustrated as clients 1 to 100 off each server. It will be appreciated, however, that the servers can vary in size and type, as can the number of participants they serve.

Rather than having a single server run a multi-user application, a common multi-user application is configured to operate on all servers in the distributed system 20. The multi-user application creates a single application environment in which all users operate. Instead of having a single server monitor and manage participant activity within the application environment, participation in the application environment is administered by each of the servers within the distributed system 20. The application environment is thus effectively mirrored on each area server 22.

As shown in FIG. 1, each server 22 manages for its 100 specific participants the environment for the multi-user application in progress. In one embodiment, no data sharing among the servers 22 is provided. A single server computer, referred to as a session master, stores the world state of all of the servers. The session master is a server computer that provides specific network functions, such as client management, arbitration, filtering, and other such functions. Each server 22 forwards information about its own 100 participants to the session master which then stores the states of all of the servers and their respective participants.

In an alternative embodiment, each server 22 forwards information about its own 100 participants to the servers in the other regions, and receives data packets describing the participants in the other regions. Each server 22 is therefore able to manage the participation of not only its own direct participants, but also allow other participants throughout the multi-user application without proportionately increasing the burden to the network backbone 10. This multi-server embodiment may be used for fault tolerant applications in which two or more servers share data, so that if one server fails another server can be substituted in its place. Such a multi-user application can also be used for load balancing in which bandwidth may be shared among multiple servers.

In one embodiment of the present invention, the distributed system illustrated in FIG. 1 includes a server process that provides a method of focusing data transferred among the participants in the network based on its relevance to each participant in the application environment. Multiple zones of interest related to application environments or participants in an application environment based on a set of predetermined characteristics are defined. This facilitates the transmission of only the most pertinent data to relevant co-participants.

The zones of interest are defined based on an object type, the position of the zone boundaries relative to the object and the priority of the zone of interest based on its proximity to and relationship with a participant. An object type is generally characterized as either real, data, text, or event, but may include user definable subtypes. A real object is a participant or entity in the application environment updated in real-time by the application. Attributes of real objects include elements such as, object orientation, location, appearance, and object type. A data object carries a participant's identity, status, or other generic information pertaining to that participant and transmitted to other participants. A text object provides for text-based materials necessary to support interactive participant communication and other ASCII applications. An event object implements interaction among participants and has attributes such as the type of event, location of the event and event duration.

Application Interface

In one embodiment of the present invention, an application interface utilized in the development of multi-user applications is executable over the distributed communication network system of FIG. 1. The application interface includes a network manager process that provides an interface to the client/server network engine of the distributed system, and enables simplified development of multi-user applications and programs, such as video games. The network manager processes all incoming and outgoing data, and includes a session master that performs client arbitration, packet filtering and application specific logic processes. The network manager enables a series of features within the distributed system 100 including client management, distributed object synchronization, bandwidth controlled data stream broadcasting, and integrated server capability.

The application interface is generally implemented as a network socket that is built upon the client/server networking structure illustrated in FIG. 1. The application interface includes tools that allow each application to declare its own object and message structures simply through a series of registration functions. It offers automated broadcasts of updates regarding an object immediately after it is created relative to a ground state. It also allows the definition of filter functions for limiting the propagation of objects, data streams and messages, and enables application callbacks for remote client updates, object updates, messages and data stream updates. The application interface including the network manager process and network socket may be referred to herein as a "distributed memory engine", since an interface is provided to the client/server network engine of a distributed system.

The application interface provides a set of functions and callback mechanisms to enable an application to synchronize the world state of clients that are connected to a server within distributed system 100. A typical application will call the socket interface to initialize the socket, perform registration, connect to the server, create objects and data streams, send messages, and invoke a network update function every frame. When new clients are detected, remote objects or data streams are updated and the application is notified by calling the functions specified in the registration. The network socket also allows the application to query the contents of objects, data streams, clients and other state variables by using the access functions.

A client application is built by linking it with the network socket library of the application interface. The client application includes hooks or other programming constructs that effect registration, connection, object creation/deletion and disconnection. Callback functions are implemented for receiving updates and messages.

In the distributed network of FIG. 1, various classes of network nodes exist. One type of node is the session master, which is a client computer with special properties. The session master performs executive functions for managing clients, monitoring object updates, and managing object filtering functions. The session master can also provide application-specific functionality. For example, if the multi-user application is a game, the session master can perform tasks such as, score-keeping, end-of-game detection, persistent world updates, and the like. Filtering functions used by the session master can be arbitrarily complex. For example, an object update can be filtered if it is not visible to the target client. This would be the case of an occlusion rejection. Note that the registration code must be identical for both the application and session master. In many cases, the client application can be identical to the session master.

The distributed network server is the central hub for all communications over the Internet. Clients must connect to the server before they can communicate with any other clients. Each server allows for multiple concurrent applications to have separate communication channels. All messages are first sent to the server and then sent on to the session master or passed on to the target clients.

The network socket of the application interface can provide server and session master services on an as-needed basis or in a dedicated fashion. This behavior is configured by the "server ownership" and "session master ownership" arguments in the call to the network connection. If ownership status is shared then the service will be provided on an as-needed basis. For example, if the session master ownership status is shared, then the first client to connect to the server will become the session master. To explicitly assign responsibility for a service, the ownership must be set to private for the client responsible and the ownership set to none for all other clients.

After connecting to the server, a client index is generated for each client. If the client is a session master, the client index will initially be set to zero. If the client is not the session master, it must wait for the session master to grant a client index. Upon connection, each client also requests creation rights for a block of objects and data streams. The session master then grants the client a block of objects and data streams. The client is then free to create objects and data streams. If the client is to be passive, it may request no objects or data streams and will only receive updates from other clients. If the session master cannot find a free client slot or honor the requested network object/data stream blocks, then the call to the network update process will return an error code to the client application.

Client Server Configurations

According to embodiments of the present invention, it is possible to configure the network socket client, server and session master in various different topologies. For example, four basic topologies are possible, as illustrated in FIGS. 2A through 2D.

Figure 2A:
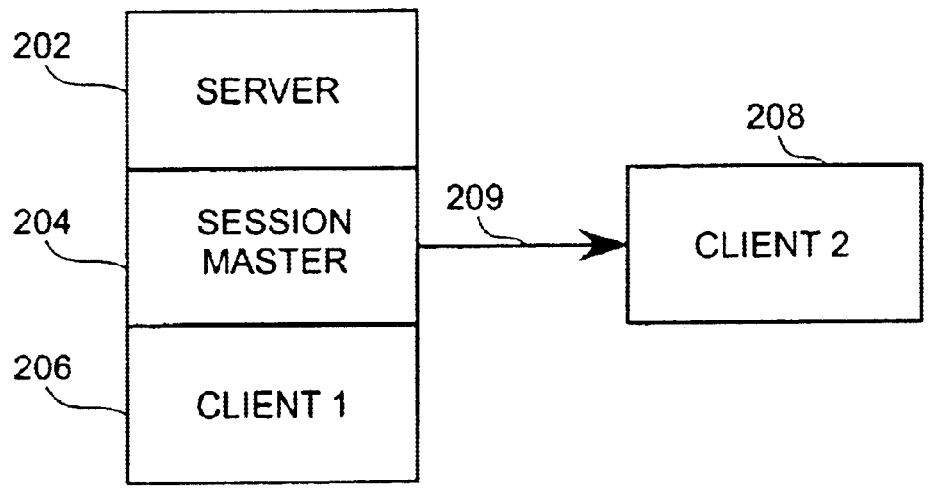
FIG. 2A illustrates a client integrated server topology for implementing the distributed memory engine, according to one embodiment of the present invention.

FIG. 2A illustrates a client integrated server topology for implementing the application interface, according to one embodiment of the present invention. For this embodiment, the session master 204 and server functions 202 are integrated into a client 206. The client 206 is coupled to one or more other clients 208 over Internet connection 209. For this configuration, both the session master ownership and server ownership is private to the first client, 206. The second client, 208 has no session master or server ownership. The advantage of this configuration is that no external server or session master is required by the system. However, the number of clients is limited by the bandwidth capabilities of the host client 206, and performance can be affected by application loading.

Figure 2B:
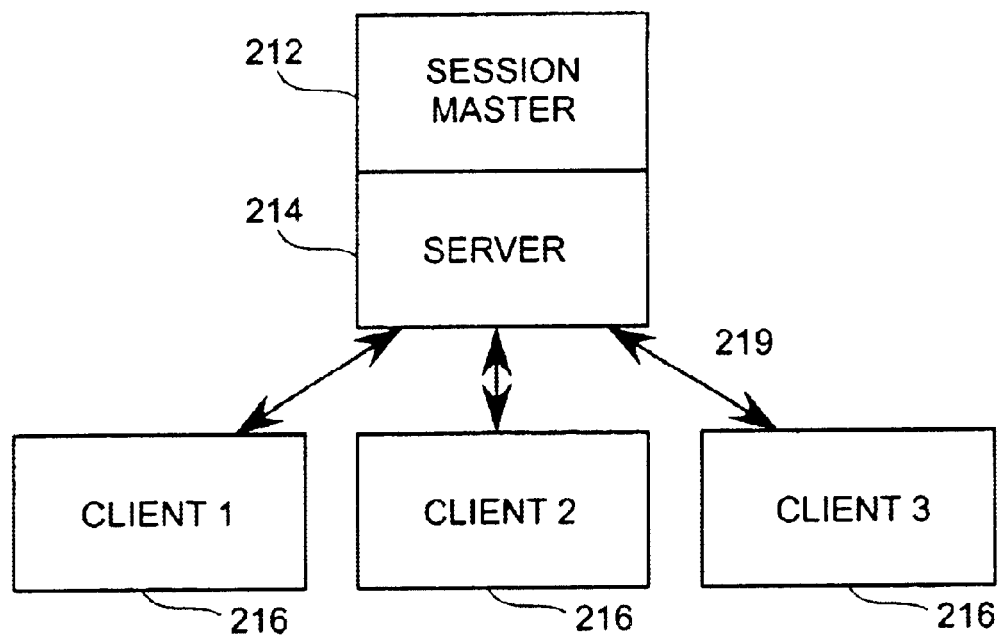
FIG. 2B illustrates an integrated single application server topology for implementing the distributed memory engine, according to one embodiment of the present invention.

FIG. 2B illustrates an integrated single application server topology for implementing the application interface, according to one embodiment of the present invention. For this embodiment, the session master 212 is implemented within a server 214, which is coupled over the Internet 219 to a number of clients 216. For this configuration, the session master ownership is private to server 214. The clients 216 have no ownership over the server or session master functions. The advantage of this configuration is that no external session master is required and packet latency is kept to a minimum. In general though, this configuration is limited to a single application per server, and performance can be affected by server loading.

Figure 2C:
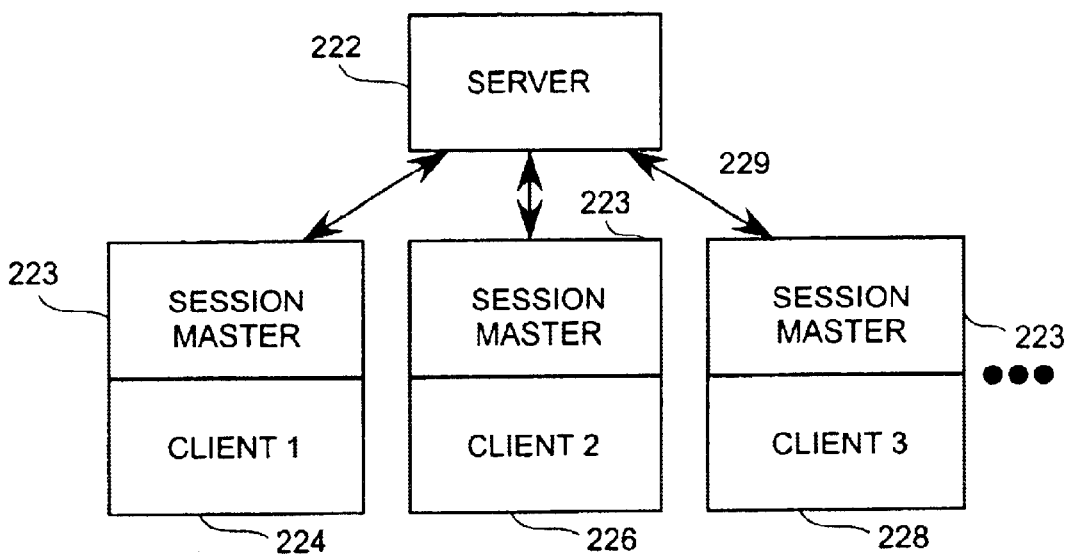
FIG. 2C illustrates a central server with portable session master topology for implementing the distributed memory engine, according to one embodiment of the present invention.

FIG. 2C illustrates a central server with portable session master topology for implementing the application interface, according to one embodiment of the present invention. In this configuration, a server 222 is coupled over Internet lines 229 to a number of clients 224, 226, and 228. The session master 223 is shared among the clients 224, 226 and 228. The server has no ownership over the session master, and the clients have no ownership over the server. This configuration does not require an external session master and features the ability to support multiple applications per server and distributed session master loading. However, this configuration is not well suited to packet filtering.

Figure 2D:
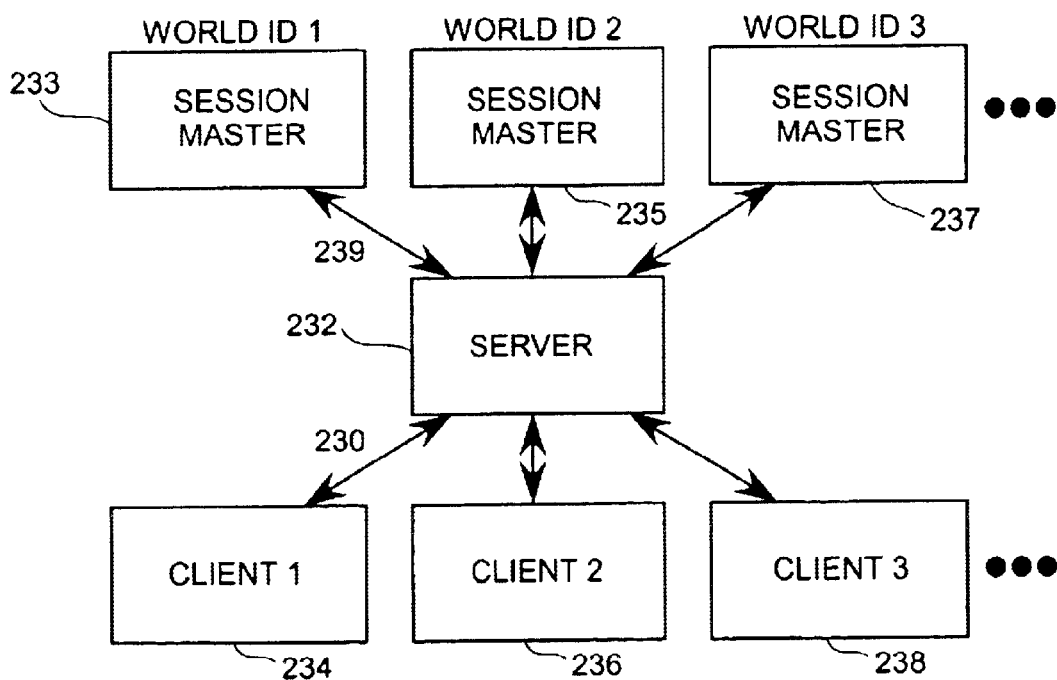
FIG. 2D illustrates a multi-application server for implementing the distributed memory engine, according to one embodiment of the present invention.

FIG. 2D illustrates a multi-application server for implementing the application interface, according to one embodiment of the present invention. In this configuration, server 232 is coupled to multiple session masters 233, 235, and 237 over LAN lines 239. Each session master is assigned a unique identification. The server 232 is also coupled to multiple clients 234, 236 and 238 over Internet lines 230. The session master ownership is private, and there is no session master ownership by either the server or any of the clients.

The server ownership is private to the server and not shared by any of the clients. This configuration requires a dedicated session master computer for each active application, but features the largest number of users per server and supports multiple applications by the server. In general, performance is unaffected by the number of active applications.

Figure 2E:
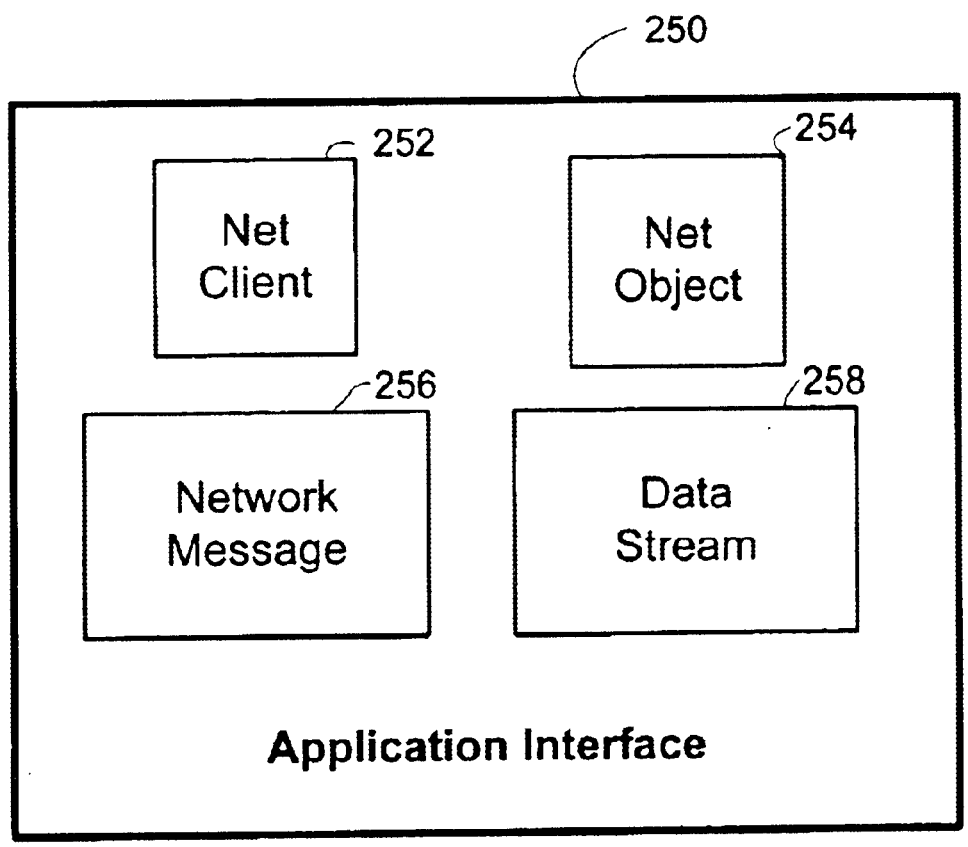
FIG. 2E is a block diagram of an application interface.

In one embodiment of the present invention, the application interface 250 of FIG. 2E incudes four atomic data structures that define the entities created and managed by the application interface for use in the multi-user application. The four data structure types are: net client 252, net object 254, network message 256, and data stream 258. The net client data structure includes client information, such as status of the client (connected, disconnected, alive, etc.), the name of the client, the number of local objects created by the client, the connection time, and so on. The net object data structure contains information pertaining to an object, such as object name, status, owner, index, current object data, and so on. The network message data structure contains information and parameters relevant to network transmissions, such as, a packet parser, latency critical flag, and message filter. The data stream data structure contains stream information, such as, status, type, data rate, target client, and stream buffer information.

Object Creation

The application interface contains network structures that allow an application to define its own data object formats. These structures can be derived from ANSI C type definitions or C++ objects. These structures are constructed of recursively defined network objects (which allows for nested structures). Network objects hold the state data of the entities within the application. For example, if the application is a multi-user game, each character or entity in the game could be a definable object. The definition of an object includes relevant parameters associated with that object, each parameter comprises a field within the definition of the object. For example, if the object in a particular game is a fighting character, the relevant object fields might include the position, velocity, orientation, size, strength, and so on, of the character.

A network object is a container structure that is created for each object within the application. A network object is composed of a plurality of fields that contain information about the relevant characteristics of the object, such as field type, size, offset and element count (for arrays), as well as other items of information that may be specified by an application developer or other type of user. The use of network objects allows the same object definition to be used for various aspects of the application. For example, a network object can function essentially as a pointer for the object with respect to network updates, graphical rendering updates, physics and behavioral updates, and other such update functions. This eliminates the need for the object characteristics to be copied multiple times for the various application functions, thus facilitating efficient application development through the use of generic application defined objects.

In one embodiment of the present invention, each field of a network object also includes a broadcast schedule. The application interface supports two types of broadcast schedules, rate limited and error limited broadcast schedules. Both types of broadcast schedules specify time periods or conditions in which object characteristics are updated. When an object characteristic is updated, the new value for the characteristic is transmitted to the other objects in the application. The rate limited broadcast schedule includes a minimum update interval that specifies the frequency with which an object characteristic is updated. The error limited broadcast threshold includes an error threshold value that specifies a percentage or absolute change value, which, if exceeded will cause an update to be sent. Thus, an object definition will include a broadcast schedule that comprises rate limited update schedules and/or error limited update schedules for each field.

Figure 3:
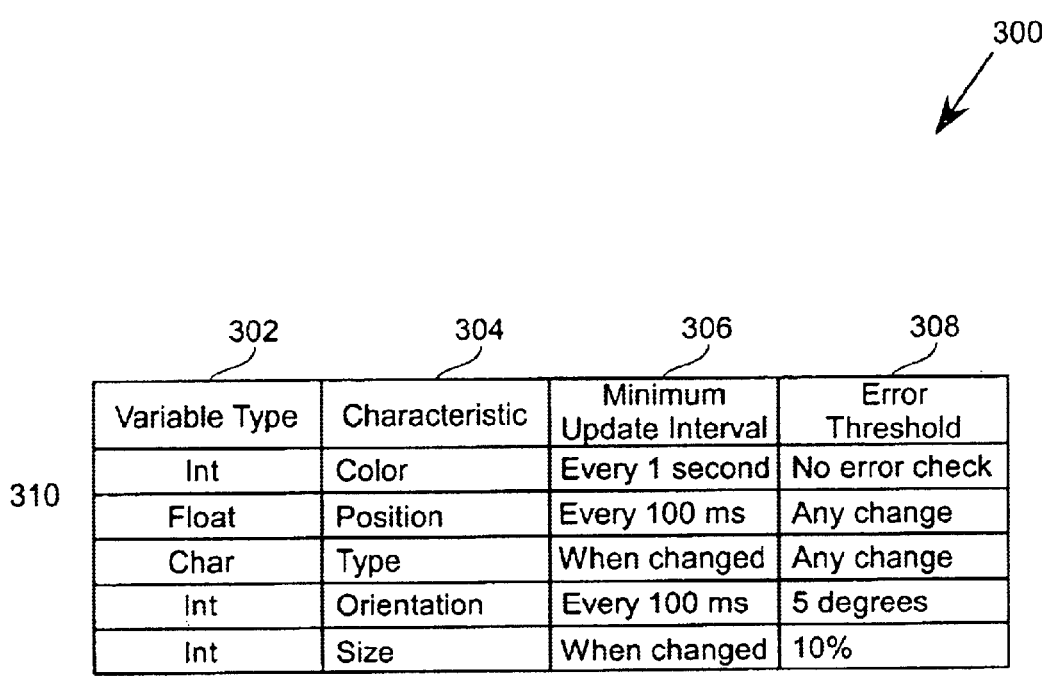
FIG. 3 is a table that illustrates the fields and broadcast schedules for an exemplary object, according to one embodiment of the present invention.

FIG. 3 is a table that illustrates the fields and broadcast schedules for an exemplary object. The object is defined by various fields 310 that define a particular characteristic of the object. Column 304 lists the characteristic specified by the field, and includes variables such as object color, position, type, orientation, and size. Column 302 lists the variable type (e.g., C++ variable type) associated with each field. Column 306 lists the minimum update interval associated with each field. For example, fields can be updated every x seconds or fractions thereof, or only when there is a change. Column 308 lists the error threshold associated with each field. Errors can be rate limited and/or error limited. There are four different types of error thresholds, these are: no threshold, threshold equality, absolute magnitude, and ratio magnitude. For the example illustrated in FIG. 3, in Table 300, the position of the object is a floating-point variable that is both rate limited and error limited. The object is updated every 100 milliseconds and if there is any change in position. The rate limited and error limited methods can be used in conjunction with one another to produce an optimal update broadcast schedule for the object.

In general, the rate limited broadcast schedule is used for characteristics that change regularly and may change rapidly, such as mouse-controlled rotational or translational movement. The minimum update interval is specified in units of time, typically milliseconds, and sets the maximum rate that an update can be sent. For example, if the minimum update interval is 100, then the maximum update frequency is 10 Hertz.

The error limited broadcast schedule allows the application to send updates when the values of particular fields are change beyond a specified tolerance. The error tolerance has four different modes. For the "no threshold" mode, the field is not checked for any changes and no updates are sent for the corresponding characteristic. For the "threshold equality" mode, any change in the characteristic will cause an update to be sent. For the "threshold absolute magnitude" mode, a threshold value is specified, and an update is sent if the amount of change exceeds the threshold value. For the "threshold ratio magnitude" mode a ratio or percentage value is specified, and an update is sent if the amount of change exceeds this ratio magnitude value.

For one embodiment, an updateable change in any field will cause the object as a whole (all of the fields) to be updated. Fields are not updated on a field-by-field basis. Alternatively, the use of rate limited or error limited update schedules for each field allows partial updates of an object to be sent to the other objects. Different update schedules or error thresholds can be provided for each field so that different object characteristics are updated at different times, or not at all. This allows update traffic for an object to be more efficiently transmitted.

Network objects are based on user-defined "Net-Structures". When a network object is created, two buffers are allocated: a Current_Object_Data buffer and a Last_Update_Object_Data buffer. The client is allowed to modify the contents of the Current_Object_Data buffer (if he currently owns it). The Last_Update_Object_Data buffer is used by the application interface to determine when changes have been made to the Current_Object_Data buffer. In this way, once the network object has been created, updates will be sent automatically.

When a network object is created, one of the arguments specified is the objects' life span. In one embodiment, network objects can have one of three levels of persistence, client, session, or permanent. For the client object lifespan (Object_Lifespan_Client), the object will persist as long as the creating client remains connected to the server. For the session object lifespan (Object_Lifespan_Session), the object will persist as long as the session master remains connected to the server. For the permanent object lifespan (Object_Lifespan_Permanent), the object will persist until it is explicitly deleted by the session master.

Network objects can be created and owned by different client entities. Each network object has a separate creator client index and owner client index field. This allows object ownership to be de-coupled from creation. Objects can also be shared among two or more clients.

Some objects are not associated with particular clients, and are referred to as "remote objects". Objects associated with a building or objects that are interacted with by several different users, such as doors or soccer balls, are examples of remote objects. In most cases, remote objects are created by the session master. This also applies to objects that persist longer than a client session. Once the session master creates the object, it can be modified by a client that requests private ownership. All remotely spawned objects must have a unique name.

In one embodiment of the present invention, the propagation of network objects can be controlled by using filter functions. Filter functions take the destination client and the network object as their input arguments and return a true/false value that signifies whether the destination client can receive the object. To enable object filtering, the application first registers the filter function by calling a register object filter process. Next, the object is created using the object filter index returned by the register object filter process. A client can be associated with a network object to determine if the client can receive the object. Messages and data streams can be directed to an individual client or broadcast to call clients by using a Send_To_All_Clients target index. Whenever a message, data steam or object update is broadcast to all clients, the scope of the broadcast can be limited by a filter function. The filter function is provided by the application and returns true if a client is allowed to receive the update. Note that each individual message type, data stream type and object can have it's own filter function or no filter function. The use of filter functions allows certain classes of clients to be allowed or disallowed from receiving updates for certain objects.

The application interface can also be configured to manage the definition of data streams or streaming objects. Data streams are well suited for sending audio/video data or for sending very large objects, such as texture maps or polygon meshes. The primary advantage of using data streams is precise control over the outgoing bandwidth. Each data stream type that the application will use is first registered. Exemplary data stream types include audio data streams and texture data streams. Each data stream type requires an update function, a stream end handler and a filter function. These functions and handlers are called when remote data streams are being received. If the remote buffer flag is set when a data stream is opened, the network socket will buffer the entire data stream object on remote client machines. Once a data stream has been registered, it is transmitted using procedure calls that open the data stream, add data to the data stream and end the data stream. The client can add to the data stream at any rate and the outgoing bandwidth will remain constant. To ensure that the data stream buffer is never overflowed, the application is not allowed to add more bytes than the value indicated as free data bytes in the data stream. In certain circumstances, the actual outgoing bandwidth may be slightly higher than the value requested to ensure that the broadcast scheduler will never fall behind, such as for data streams that are fed by hardware audio/video codecs. It should also be noted that the data stream does not close until all pending data has been sent.

If the target for data stream is all of the possible client computers on the network, and the filter function for the stream type is non-null, it will be broadcast to the session master for filtering. When the session master is re-broadcasting a filtered data stream, it will call the filter function for all clients and only send to those that pass the filter function.

Network Messages

In one embodiment of the present invention, the network socket of the application interface uses network messages to communicate all data between clients. Each message consists of a one byte header (packet type) followed by the actual data (which can be any size). The network socket may register several packet types for its own internal use. Application defined network messages are intended to communicate events that are transient in nature. Such events can include chat messages, object movement commands, and the like. To use a network message, a client first registers a packet structure by calling a "Register Net Packet" function. This function returns the packet type for the new message. To send the message, the client fills out all of the fields of the message packet structure and calls a function that adds the packet to the transmit buffer. The first byte of the message packet must always be the packet type. The message can be directed to an individual client or all possible clients, if the Send_To_All_Clients target index is used. If the message is sent to all clients and the message has a filter function then the message will be filtered in the same way as objects and data streams are filtered. Once a message is received, the registered packet parser is called and the application can process the message. Note that because the packet parser must always return the total size of the message in bytes, a message can have a variable length.

Figure 4:
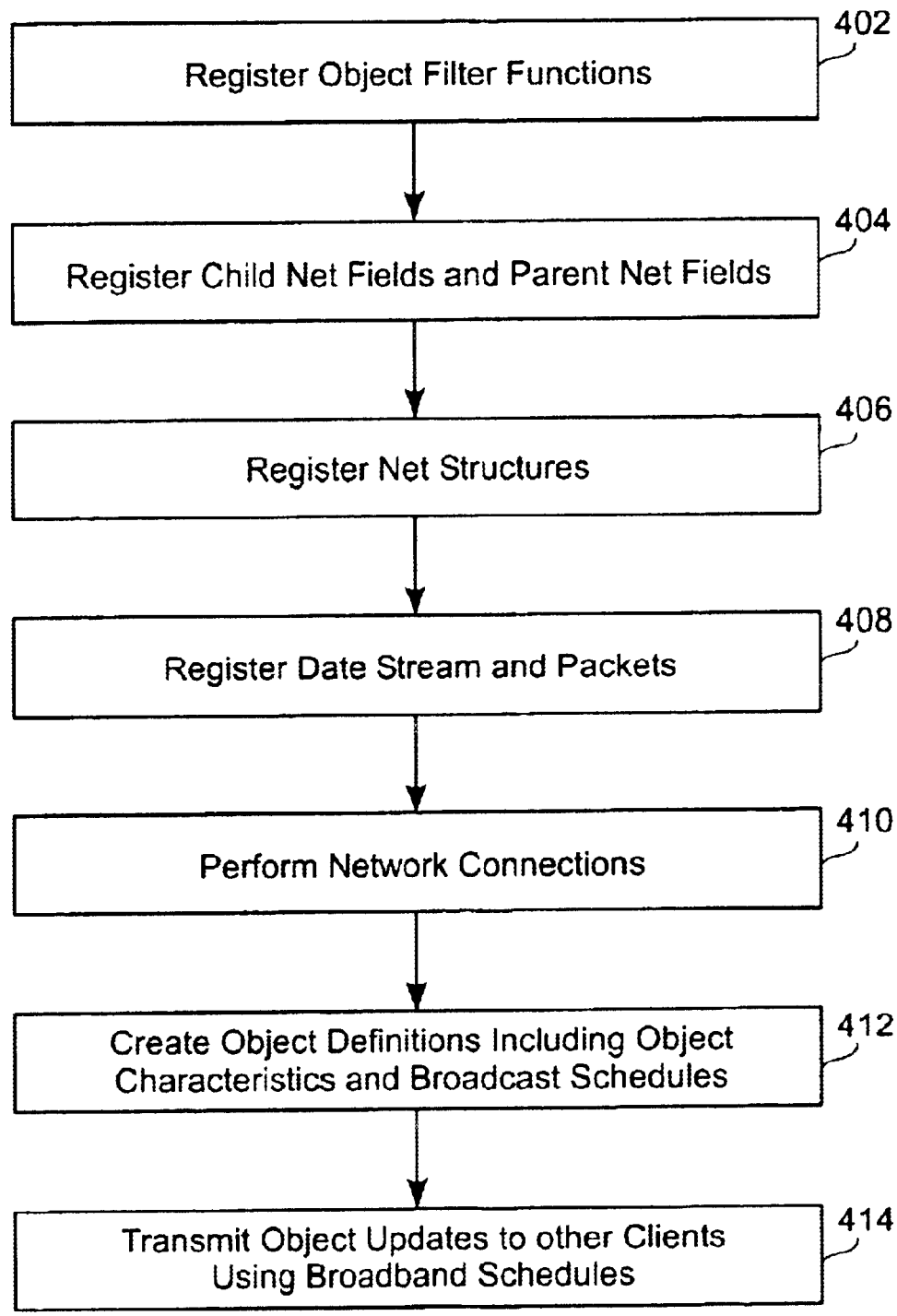
FIG. 4 is a flowchart that illustrates the steps of initializing an application and creating objects using an application interface, according to one embodiment of the present invention.

In order to use the application interface for development of applications executable over the distributed network of FIG. 1, certain steps must be undertaken by the application program. One of the first steps is registering the application to resolve dependencies among the various functions and entities. In one embodiment, application registration proceeds in the following order: object filter functions (if needed) are first registered. Child net fields and parent net fields are then registered, followed by registration of net structures and data streams (if needed), and then Packets (if needed). After the appropriate registrations have been performed, a network connection process is performed. Once this initialization sequence is completed, the application can proceed to create objects and data streams for broadcast. A flowchart illustrating this overall process is provided in FIG. 4. The registration functions are illustrated in steps 402 to 408. After the registration steps are performed, the client calls a network connect function to connect to the network. After the connection and initialization sequence is complete, the objects can be created by the client, steps 412. The process of creating the objects includes defining the characteristics of the object as fields in the object definition, as well as creating broadcast schedules for the fields. As described above, broadcast schedules can be rate limited or error limited. Once created, all application functions and calls involving the object use the object definition created by the client. During execution of the application, the object updates are transmitted to the other clients using the defined broadcast schedules, step 414.

In one embodiment of the present invention, the application interface can be used to develop a multi-user game for use over the distributed network of FIG. 1. For this embodiment, the created objects are typically game characters or objects that move through virtual environments created by the network application. Each client may control one or more characters or game entities. The characteristics of each game entity controlled by a client is defined by the client. The broadcast schedules control the update of object characteristics to the other clients. The use of partial updates advantageously makes data transmission over the network more efficient. Using the broadcast schedules and filter functions, the application interface allows the client to define the object such that the appropriate clients receive the proper update transmissions.

In general, all clients receive all fields of an object during an object update step. The update rate for the object fields, however, may vary for each client and for each object. A load balancing technique is used to provide the appropriate level of detail, reflected in the update rate, required by different clients. For example, in a flight simulation program, objects that are closer to a user's reference point are deemed more important and are updated more frequently than objects that are farther away. In this case the update rate is inversely proportional to the distance from a reference point. Other factors can also be used to determine the update rate. For example, objects may be ranked in order of intrinsic importance, with more important objects updated more frequently than less important objects. In the flight simulator example, certain types of objects, such as other planes may be classified as more important relative to other types of objects, such as ground based objects. The update rate for this application could be the product of the intrinsic importance of an object and its distance from the point of reference. Other types of factors can also be used to determine the update rate, such as potential fields, which defines the importance of the object relative to a point of interest, and so on.

In general, the multi-user application developed using the application interface can be any type of application that involves the creation and transmission of data among different client computers in a distributed network. For example, the multi-user application may be a teleconferencing application utilizing audio, visual, or combined audio/visual data. For this application, the objects may be data streams that encapsulate the audio/visual or text data. The client structure contains a field that allows the client to be associated with a network object. Filters can be used to allow or block access by certain clients to the transmitted data streams. Other types of applications that can be developed using the application interface described herein include real-time or virtual real time interactive applications, such as on-line auction or bidding programs, interactive educational applications, multi-user simulation or combat programs or similar types of applications that require the definition and interaction of various objects among distributed client computers.

The application interface can be used to develop multi-user applications that implement the distributed network architecture described in the aforementioned U.S. Pat. No. 5,841,980, which is hereby incorporated by reference. For this embodiment, the multi-server management system and multiple zones of interest created within the network described therein are used in conjunction with the client defined objects and broadcast schedules and filters created using the application interface of the present invention.

In the foregoing, an application interface and network socket system for the development of multi-user applications over a distributed network has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for providing an application interface for a multi-user application executable on a distributed network system, comprising the steps of:

providing a object definition structure for an object utilized by the multi-user application, the object definition structure comprising a plurality of functional characteristics defining the object, and an update schedule for one or more of the functional characteristics; and automatically updating at least one of the plurality of functional characteristics in accordance with the update schedule during execution of the multi-user application on the distributed network.

2. The method of claim 1 wherein the object definition structure further comprises an error limited broadcast schedule for one or more of the plurality of functional characteristics, and further comprising the step of automatically updating a functional characteristic only when a change in the value of the functional characteristic exceeds a respective error limit.

3. The method of claim 2 wherein each of the plurality of functional characteristics of the object are updated by transmitting the functional characteristics periodically based on the update schedule or in accordance with the error limited broadcast schedule to other objects utilized by the multi-user application.

4. The method of claim 3 further comprising the step of providing one or more filter functions for limiting propagation of the updated functional characteristics of the object to one or more of the other clients within the network.

5. The method of claim 3 wherein the object is embodied within a data stream of audio/video data transmitted over the network.

6. The method of claim 1 wherein the object definition structure for the object is determined by the multi-user application, and wherein the object definition structure is utilized by a plurality of processes implemented by the multi-user application.

7. The method of claim 6 wherein the distributed network system comprises a plurality of servers interconnected by a network backbone, each server hosting at least one local client, and each local client having at least one local participant.

8. The method of claim 7 wherein the multi-user application comprises an interactive video game, and wherein the plurality of functional characteristics includes at least one of: network updates, graphical rendering updates, and physics based behavioral updates.

9. The method of claim 8 wherein the object comprises an interactive video game character, and the functional characteristics comprise at least one of: a position of the character, a size of the character, and an orientation of the character.

10. The method of claim 7 wherein the multi-user application comprises an interactive communication program for the transmission of communication content among users of the network, and wherein the plurality of functional characteristics includes at least one of: communication updates, user privilege updates, and network interface updates.

11. The method of claim 10 wherein the object comprises one or more of: a streaming audio data set, a streaming video data set, and a text-based data set.

12. A system for a multi-user application executable by a plurality of client computers coupled in a communication network, comprising:

a first client providing an object definition for an object utilized by the multi-user application, the object definition having a structure comprising a plurality of functional characteristics defining the object, and an update schedule for one or more of the functional characteristics; and a second client coupled to the first client and configured to manage data transmission between the first client and other clients coupled to the communication network and to filter object updates transmitted to the other clients, wherein the object updates of the functional characteristics of the object are automatically transmitted during execution of the multi-user application by the first client in accordance with the update schedule on the distributed network.

13. The system of claim 12 wherein the structure of the object definition further comprises an error limited broadcast schedule for one or more of the functional characteristics, and wherein the functional characteristics are only updated when a change in value of a functional characteristic exceeds a respective error limit.

14. The system of claim 13 wherein the functional characteristics of the object are updated by transmitting the functional characteristics periodically based on the update schedule or in accordance with the error limited broadcast schedule to other objects utilized by the multi-user application.

15. The system of claim 12 wherein the communication network comprises a plurality of servers interconnected by a network backbone, each server hosting at least one local client, and each local client having at least one local participant.

16. The system of claim 15 wherein one server of the plurality of servers controls transmission of data among the first client, second client and the other clients utilizing the object created by the first client.

17. The system of claim 16 wherein at least one of the other clients may update the object created by the first object.

18. The system of claim 12 wherein the object definition created by the first client is used by all functions and processes within the multi-user application that utilize the object.

* * * * *